July 14, 1959  H. R. BILLETER ET AL  2,894,659
TANK UNLOADING APPARATUS

Filed Dec. 16, 1955  7 Sheets-Sheet 1

INVENTORS
HENRY ROBERT BILLETER
GEORGE B. RICHARDS
BY

ATTORNEYS

INVENTORS
HENRY ROBERT BILLETER
GEORGE B. RICHARDS
ATTORNEYS

United States Patent Office 2,894,659
Patented July 14, 1959

2,894,659

TANK UNLOADING APPARATUS

Henry Robert Billeter and George B. Richards, Deerfield, Ill., assignors, by mesne assignments, to Liquid Controls Corporation, North Chicago, Ill., a corporation of Illinois Application December 16, 1955, Serial No. 553,592

4 Claims. (Cl. 222—72)

This invention relates to tank unloading apparatus and has to do more particularly with apparatus wherein gas under pressure is introduced into the tank to discharge or aid in discharging the liquid from the tank.

Liquid materials which are handled in bulk, such as petroleum products, milk, chemicals and others, are customarily stored in large tanks and are transported either by pipeline or tank truck. Customarily, such liquid products are discharged from the tanks (either fixed or on trucks) by gravity means. However, this mode of discharging tanks is comparatively slow, particularly where the discharge head is relatively low, as where the tank from which the liquid is to be discharged is not very much higher than the tank into which the liquid is to be discharged, and where there is an appreciable pressure loss in the conduit leading from the tank to the discharge point, as in the case where elements such as meters, strainers, valves and the like are connected in the discharge line.

In discharging liquids from storage tanks or the like it is customary to provide in the discharge line means for measuring the amount of liquid discharged. Such means customarily includes a meter of the positive displacement type having one or more displacement rotors rotated by the flow of the liquid through the meter to effect actuation of a counter. The displacement rotor or rotors also are rotated by the flow of air or other gases through the meter with the result that the counter is actuated and gives a reading upon the flow of air or other gases through the meter. In discharging a tank, air may enter the discharge connection, as for example when the tank is completely discharged and before the operator halts the further discharge, or where the discharge is transferred from one tank to another tank, or from one compartment of a tank to another compartment, with the result that the meter will continue to operate and to indicate the flow of fluid, thereby incorrectly indicating the total flow of liquid.

Air eliminators have heretofore been employed in connection with meters in conventional tank discharge apparatus for the purpose of removing from the line ahead of the meter any air or other gases. However, we have found that where, as in our invention, a gas under pressure is introduced into the tank to aid in discharging the contents, the air eliminator may be ineffective to remove all of the air and other gas with the result that some air and gas passes through the meter and renders the reading thereof inaccurate.

An object of the present invention is to provide apparatus for unloading liquid tanks wherein is provided means for speeding the discharge of liquid from the tank and for accurately measuring the amount of liquid discharged.

Another object is to provide apparatus for unloading liquid tanks wherein is provided novel means for applying a gaseous pressure to the contents of the tank to discharge or to aid in discharging the liquid from the tank and novel means for accurately measuring the flow of liquid from the tank.

Another object is to provide tank unloading apparatus wherein gas under pressure is introduced into the tank to discharge or aid in discharging the liquid and wherein means are provided for automatically closing the discharge line when air or other gas enters the discharge line.

Another object is to provide tank unloading apparatus wherein means are provided for applying a gaseous pressure to all of the compartments of a compartmented tank to discharge or aid in discharging the tank and wherein means are provided for preventing the loss of the pressure established in the tank should the operator fail to shut off the discharge line upon the completion of the discharge of any of the compartments.

Another object is to provide a self-contained, mobile tank and unloading apparatus including means for establishing a gaseous pressure on the contents of the tank and means for controlling and measuring the discharge of liquid from the tank.

Another object is to provide tank unloading apparatus wherein the pressure developed by the exhaust from an automotive engine is utilized to discharge or aid in discharging the liquid from the tank and wherein the amount of liquid discharged may be accurately measured.

A further object is to provide tank unloading apparatus wherein the exhaust gases from an automotive engine are employed to discharge or aid in discharging the liquid from the tank and the amount discharged may be accurately measured, which apparatus is simple and inexpensive to manufacture and is simple and safe in operation.

Another object is to provide a tank unloading apparatus wherein the exhaust gases from an automotive engine are employed to apply pressure to the liquid in the tank to discharge or aid in discharging the liquid and the amount discharged may be accurately measured, which apparatus may be readily installed in an existing tank truck of conventional construction.

A further object is to provide tank unloading apparatus wherein the exhaust gases from an automotive engine are employed to apply pressure to the liquid in the tank to discharge or aid in discharging the liquid and the amount discharged accurately measured, which apparatus is relatively small and light in weight and may be mounted readily in a tank truck for attachment to the engine exhaust.

Still another object is to provide improved tank unloading apparatus whereby liquids may be discharged from a tank under gaseous pressure and the amount discharged accurately measured.

A further object is to provide improved tank unloading apparatus having means pressurizing the tank and means for measuring the amount discharged, in which apparatus is embodied means for automatically stopping the discharge whenever air or other gas passes into the discharge connection and before it passes through the meter, whereby no inaccuracies in measuring can result from the passage of air through the meter.

Other objects and advantages of the invention will appear from the following description taken in connection with the appended drawings wherein.

In accordance with the present invention, we employ the pressure of the exhaust gases developed in the internal combustion engine, preferably the engine of the tank truck, for creating pressure within the tank to be discharged to discharge or aid in discharging the liquid from such compartment. The invention contemplates the provision of means for applying the gaseous pressure safely and without incurring the liability of igniting the liquid being discharged and hence the apparatus is well adapted for discharging not only inert liquids such as milk, but also inflammable liquids such as petroleum products, and the like.

We also provide means for accurately measuring the amount of liquid. Such means includes a meter and means for insuring that no air or other gas passes through the meter, thus preventing a false reading by the meter of the liquid flow. To this end we preferably employ an air eliminator ahead of the meter, a cut-off valve beyond the meter and mechanism actuated by the air eliminator for actuating the valve. It will be understood that while we prefer to employ the arrangement herein disclosed, other means for preventing the flow of air or other gas through the meter may be substituted. At this point it should be explained that there will normally be some air present above the liquid in each of the tank compartments, and when the exhaust gases are introduced into the tank there will be a mixture of air and other gases, including in some cases vapor from the tank contents. For convenience hereinafter, we employ the term "gas" to designate either air, exhaust gases, or vapor, or a combination of such gaseous materials.

Figure 1:
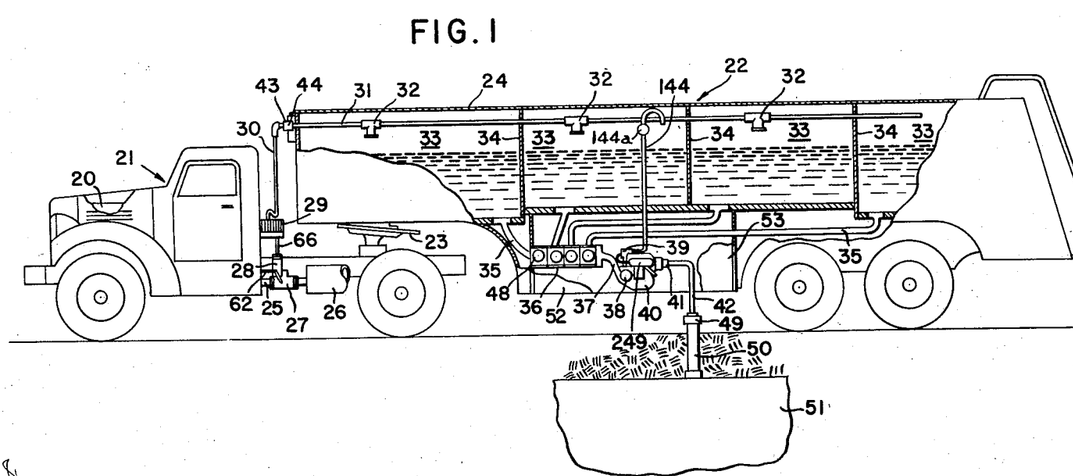
Figure 1 is a side elevational view with parts broken away and in section of a tank truck embodying the present invention.
Figure 2:
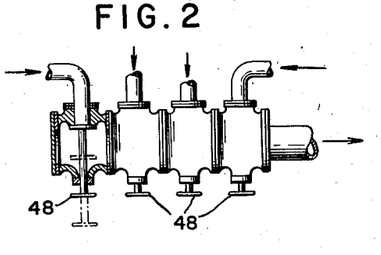
Fig. 2 is an enlarged fragmentary view showing the discharge manifold forming a part of the system carried on the tank truck of Fig. 1.

Referring now particularly to Fig. 1 of the drawings, a preferred embodiment of the invention is disclosed wherein it is applied to the discharge of liquid from a tank truck trailer and wherein the means for creating the gaseous pressure and the discharge control and metering means all are carried by the tank truck.

It will be understood that the tank truck illustrated in Fig. 1 is adapted to be discharged into an underground storage tank and such tank has been illustrated in Fig. 1. However, the tank truck may discharge into a tank located above ground, provided that the level of the truck, when discharging, is sufficiently above the level of the tank into which the liquid is to be discharged to permit gravity flow of the liquid from the tank truck into the receiving tank.

There is illustrated in Fig. 1 a tank truck of conventional construction, including a tractor unit 21 and a semi-trailer 22 having a tank 24, and connected to the tractor unit in the usual manner, as by a fifth wheel construction 23. Carried by the tractor unit 21 and forming a portion thereof is the usual internal combustion engine 20 from which leads an exhaust line 25 connected to a muffler 26. A pressure regulator 27 is connected in the exhaust line 25 and a fire stop or flame arrester 28 is connected to the housing of the regulator 27 on the inlet side thereof. Connected to the fire stop is an intercooler or heat exchanger 29, and leading therefrom is a flexible pipe or hose 30 which connects through a separable coupling 43 with a gas inlet manifold 31 which extends into the tank portion of the semi-trailer 22 and communicates through inlets 32 with each of the several compartments 33 of the semi-trailer tank 24. The compartments 33 are defined by partitions or baffles 34 constructed in the usual manner and provided for the usual purpose.

Leading from the several compartments 33 are discharge pipes 35 all of which are connected with a discharge manifold 36 including valves 48 controlling flow through the several pipes 35 respectively. Preferably a suitable "anti-swirl" baffle (not shown) of known construction is provided at the intake end of each discharge pipe 35 to prevent the formation of a vortex when the liquid flows from the tank. A single outlet pipe 37 connected to the discharge manifold leads to a strainer 38 with which is associated an air eliminator 39. The strainer casing is connected to a meter 40 which in turn is connected to a cut-off valve 41, actuated from the air eliminator by a valve control mechanism 249 (see Fig. 24).

The internal combustion engine 20, exhaust line 25, muffler 26, pressure regulator 27, fire stop 28, intercooler 29, pipe 30, and the connected portion of the coupling 43, are carried by the tractor unit. The remainder of the coupling 43, swing check valve 44, manifold 31, discharge pipes 35, manifold 36, outlet pipe 37, strainer 38, air eliminator 39, meter 40, cut-off valve 41, valve control mechanism 249, and hose 42 are carried by the semi-trailer unit.

The separable coupling 43 permits separation of the semi-trailer unit from the tractor unit. The swing check valve 44 closes the manifold 31 when the coupling 43 is uncoupled, or at any other time when the gas pressure in the pipe 30 is less than that in the tank to prevent outflow of gas from the tank through the manifold 31. The flexible hose 30 permits the semi-trailer to move angularly relatively to the tractor.

Connected to the cut-off valve 41 is a discharge line 42 which preferably takes the form of a flexible hose and is adapted to be carried on the semi-trailer for connection to a lead-in pipe 50 of a tank, such as the stationary tank 51, into which the liquid from the tank truck is adapted to be discharged. For this purpose a separable coupling 49 is provided for connecting the pipe or hose 42 to the inlet pipe 50.

The semi-trailer unit 22 is provided with the usual compartment or cabinet 52 in which the discharge manifold 36, strainer 38, air eliminator 39, meter 40, shut-off valve 41, valve control mechanism and discharge hose 42 are housed, the compartment being provided with the usual doors 53 by which access may be obtained to the interior of the compartment.

Figure 3:
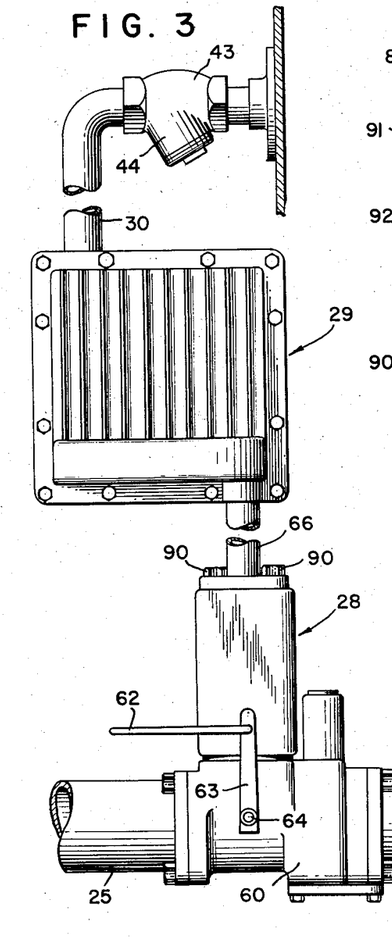
Fig. 3 is an enlarged fragmentary view showing a portion of the system for applying gaseous pressure to the tank.

The pressure regulator valve 27 includes a casing or housing 60 (see Figs. 3 and 4) which is connected at one end to the exhaust line 25 from the engine 20 and at the other end to the exhaust line leading to the muffler 26. Swingably mounted in the housing 27 is a butterfly valve 61 which is adapted to be moved between a position closing the passage through the valve and a position opening the passage to permit the flow of exhaust gases therethrough. The valve 61 is adapted to be controlled by a control cable 62 connected to an arm 63 carried on a shaft 64 on which the valve 61 is mounted. The control cable 62 extends to the cab of the tractor and is adapted to be actuated by the operator as by means of a suitable control lever (not shown).

Figure 4:
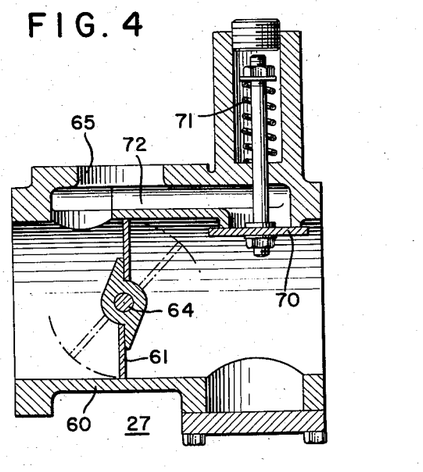
Fig. 4 is an enlarged fragmentary vertical sectional view showing the pressure regulator valve.

Leading from the housing 60 is a take-off outlet 65 through which exhaust gases may pass into the casing of the fire stop 28. The take-off outlet 65 leads from the casing 60 ahead of the valve 61 whereby when the latter is in closed position all of the exhaust gases are led from the housing 60 to the fire stop 28. When the valve is in open or partially open position only a portion of the gases are conducted to the fire stop 28 and the remainder are discharged to the muffler 26. Thus, the operator may control the pressure of the exhaust gases which pass into the line leading to the tank.

A self-closing pressure relief or safety valve 70 is provided in the pressure regulator valve housing 60 for the purpose of preventing the establishment of excessive pressure in the line leading to the tank 24. The valve 70 is normally urged into closed position by a spring 71 for closing a passage 72 leading around the valve 61 and providing a by-pass around the valve. The spring 71 is of such strength as to permit the valve to open whenever the pressure in the take-off outlet exceeds a maximum predetermined pressure, thereby permitting at least some of the exhaust gases to by-pass the valve 61 and reducing accordingly the pressure in the line leading from the take-off outlet 65.

Connected to the take-off passage 65 and, for convenience, mounted directly on the housing 60 of the pressure regulator valve 27 is the fire stop or flame arrester 28. While this may be of any suitable construction we prefer to employ the construction illustrated in Fig. 5 of the drawings. The fire stop includes a hollow casing or housing 80 which preferably is mounted on the top surface of the pressure regulator housing 60 and is secured thereto as by bolts (not shown). The housing 80 has an inlet 81 which when the housing is mounted on the housing 60 registers with the take-off outlet 65 and provides communication between the interior of the pressure regulator valve housing 60 and the fire stop housing 80.

Figure 5:
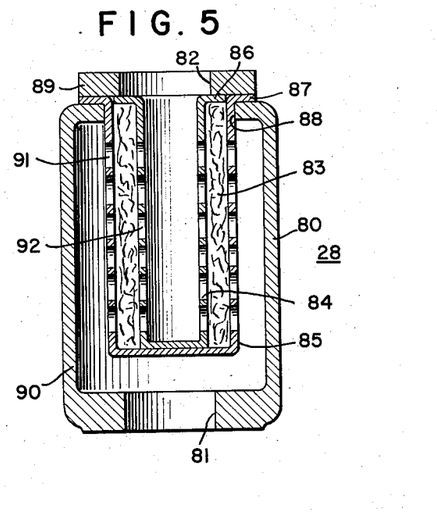
Fig. 5 is an enlarged vertical sectional view showing the fire stop or flame arrester.
Figure 6:
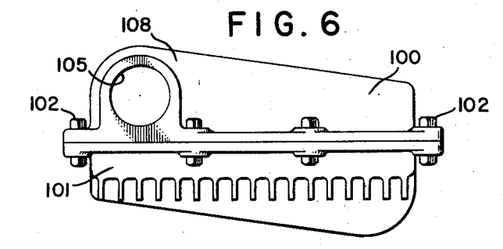
Fig. 6 is a top view of the intercooler.
Figure 7:
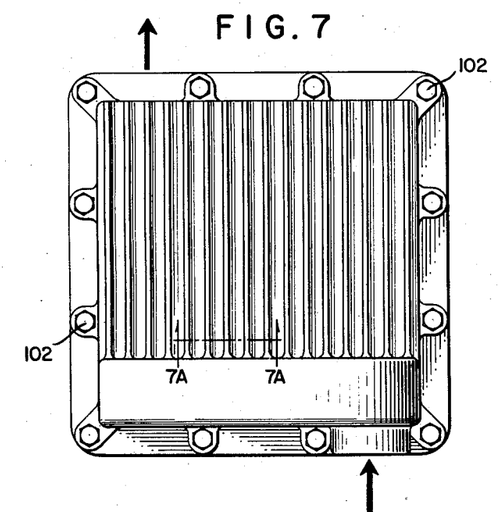
Fig. 7 is a side view of the intercooler.
Figure 7A:
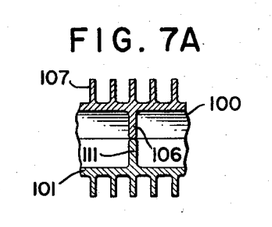
Fig. 7A is an enlarged, fragmentary, sectional view of a detail of the intercooler.
Figure 8:
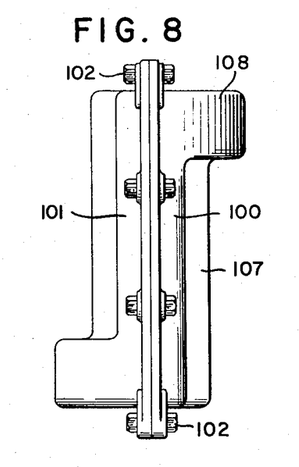
Fig. 8 is a front view of the intercooler.
Figure 9:
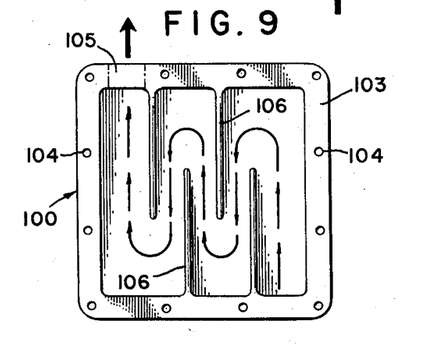
Fig. 9 is an inner face view of one of the casing sections forming a part of the intercooler.

The fire stop 28 includes means for providing a plurality of tortuous paths through the housing 80 from the inlet 81 to an outlet 82 and these passages preferably are provided by a mass 83 of crumpled foil formed from a suitable metal, such as aluminum, which mass is held between a pair of telescopingly arranged elongated cupped members 84 and 85 provided with out-turned flanges 86 and 87 at their upper ends by which the cupped members 84 and 85 are retained in the housing 80 and in proper relation with each other. The outer cupped member 85 is fitted into an opening 88 in the upper end of the casing 80 and a flange 89 is secured to the casing 80, as by bolts 90, which also serve to secure the members 84 and 85 in the casing 80.

The cupper members 24 and 85 are provided in their side walls with a number of relatively large openings 92 and 91 respectively thereof whereby gases may pass through such members and through the crumpled aluminum foil 83 which is retained between such members. Thus it will be seen that the gases may pass from the housing 60 of the pressure regulator through the take-off outlet 65 and inlet 81 and into the interior of the housing 80 from which the gases pass through the openings 91, and 92, the passages in the foil mass 83, and then through the interior of the member 84 and out through the opening 82 into the pipe 66 which leads to the intercooler 29. The tortuous passages provided by the foil mass prevent the passage out of the fire stop 28 of any flames which may have passed from the engine. At the same time the exhaust gases may pass through the fire stop without an excessive loss in pressure.

The intercooler 29 is provided for the purpose of cooling the exhaust gases passing from the fire stop 28 to a temperature whereby when they are discharged into the tank 24 they will not cause dangerous or detrimental overheating, or ignition of the contents of the tank. While any suitable form of intercooler may be provided, we prefer to employ one which causes only a relatively small pressure drop therethrough but at the same time provides the requisite amount of cooling, whereby the pressure of the gases which are discharged into the tank are sufficient to effect the desired discharge of the tank contents.

There is illustrated in Figs. 6 to 10 inclusive a preferred form of intercooler 29 which embodies the characteristics desired in an intercooler for use in the system in accordance with the present invention. This intercooler is of extremely simple form and may be manufactured and assembled very ecoomically and provides the desired cooling of the gases with a minimum of attention over a long period of use. At the same time the pressure drop therethrough is not excessive.

The intercooler comprises two casing sections 100 and 101, each formed of suitable metal having an adequate strength and heat conductivity, as for example steel, which sections are connected together as by bolts 102. The casing section 100 takes the form of a generally square, dished member having a peripheral flange 103 provided with openings 104 to receive the bolts 102. Extending parallel to one edge of the casing section 100 and adjacent the edge is an enlarged portion 108 provided with an opening 105 leading through the end wall of the enlarged portion 108 and into the interior of the casing section 100. Extending upwardly from the bottom wall of the casing section 100 is a plurality of baffles 106 which are arranged in alternating arrangement whereby alternate baffles extend inwardly from opposite side walls of the casing section 100 as illustrated particularly in Fig. 9 of the drawings. Formed on the outer face of the section 100 is a plurality of parallel upstanding heat-radiating fins 107.

Figure 10:
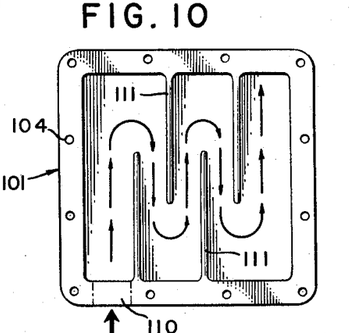
Fig. 10 is an inner face view of the other casing section forming a part of the intercooler.

The casing section 101 is formed in a manner generally similar to the casing section 100 except that the opening 110 is on the opposite side from the opening 105 and the baffles 111 are arranged so as to abut the baffles 106 of the section 100 and form therewith a tortuous passage leading from the opening 110 to the opening 105, when the sections are bolted together.

Means (not shown) may be provided for draining from the intercooler any liquid which may condense within the intercooler. Such means preferably takes the form of a drain opening or openings (not shown) at the lower portion of the casing, each suitably closed as by a removable plug (not shown).

The exhaust gas in passing from the inlet opening 110 through the tortuous passage and out the opening 105 is cooled and passes from the heat exchanger at a temperature which is sufficiently low so that the contents of the tank are not overheated or ignited.

Figure 11:
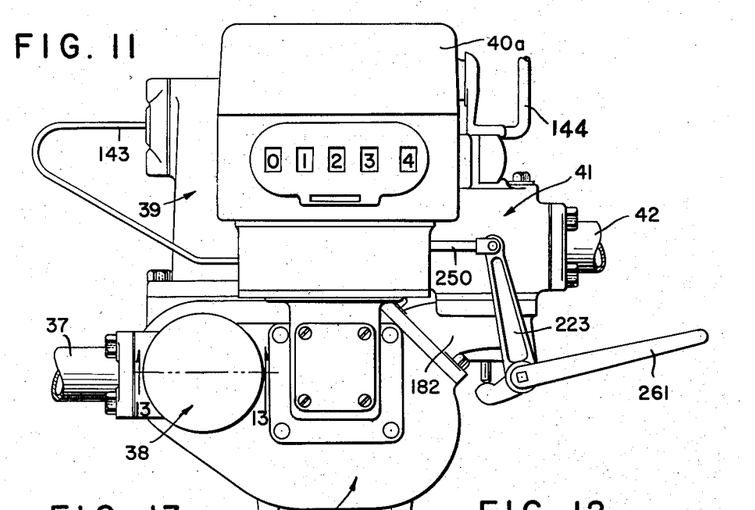
Fig. 11 is a side elevational view of the strainer-air eliminator-meter-valve assembly.

Referring now particularly to Fig. 11, the strainer 38, air eliminator 39, meter 40 (which includes a counter 40a) and cut-off valve 41, as well as the actuating mechanism (hereinafter described) for the cut-off valve, preferably all are assembled to form a unitary structure as shown, which structure is rigidly mounted within the cabinet 52.

The strainer 38 may be of any suitable conventional construction and is disposed in a casing 120 having its inlet connected to the outlet pipe 37 leading from the manifold 36 and its outlet connected to the inlet of the casing 121 of the meter 40. Removably disposed in the casing 120 is a basket 122( see Fig. 13) of conventional form. The front of the casing is provided with an opening 123 through which the basket may be removed and which is closed by a cover plate 124 suitably secured in place as by interrupted threads (not shown). The strainer 38 serves the conventional purpose of straining out from the liquid any solid particles such as grit or dirt or the like.

Disposed above and connected to the strainer casing is an air eliminator 39 the purpose of which is the removal from the line of any gas which may enter the line so that no gas passes through the meter, whereby the meter accurately meters the liquid passing through the line.

The air eliminator preferably is formed as disclosed and claimed in the copending application of Henry Robert Billeter and George B. Richards, filed June 1, 1955, Serial No. 512,551, now abandoned in favor of our continuation application Serial No. 775,077, filed November 19, 1958, and our divisional application Serial No. 775,045, filed November 19, 1958.

The air eliminator 39 includes a casing 130 defining a float chamber 131 (see Figs. 15 and 16) which is in communication at its lower end with the interior of the strainer casing 120 through openings 133 formed in a plate 134 secured in the casing 130 for a purpose which will appear hereinafter. The air eliminator casing 130 is secured to the casing 120 in sealing relation therewith.

Figure 15:
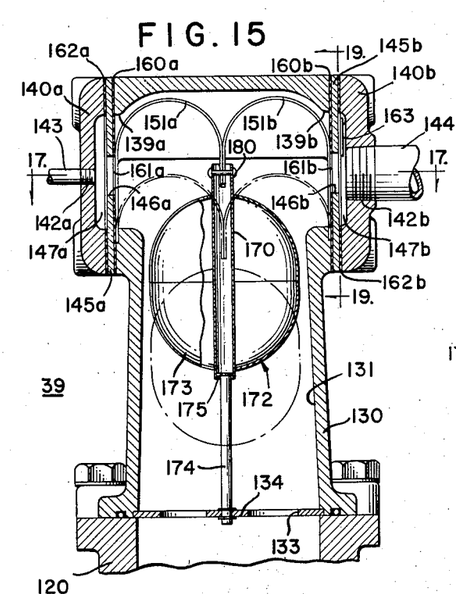
Fig. 15 is an enlarged vertical sectional view through the air eliminator head.
Figure 16:
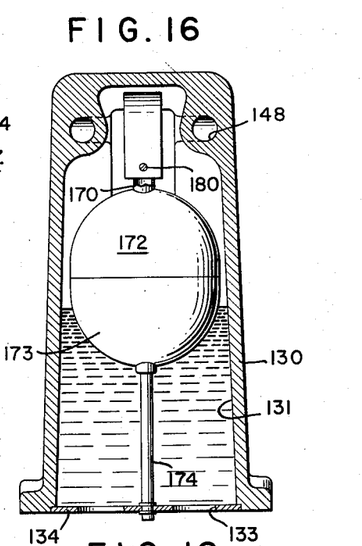
Fig. 16 is a view similar to Fig. 15, only taken along a vertical plane at right angles to the plane of Fig. 15.

The casing 130 is provided at its upper portion with openings 139a and 139b at opposite portions thereof, which openings are closed by end plates 140a and 140b respectively secured to the casing and provided with openings 142a and 142b into which are threaded pipes 143 and 144.

The pipe 143 leads to the cylinder 256 of a valve control mechanism 249, and the pipe 144 leads into one of the tank compartments 33 and is provided with a check valve 144a, all for a purpose hereinafter explained.

Secured between the casing 130 and each of the end plates respectively are orifice plates 145a and 145b provided with elongate orifices 146a and 146b respectively. The end plates 140a and 140b are recessed and provide with the respective orifice plates 145a and 145b, chambers 147a and 147b which communicate with the float chamber through the orifices 146a and 146b, except when the latter are closed by the valves hereinafter described.

Suitably secured in place against the inner faces of the orifice plates 145a and 145b are cover gaskets 160a and 160b, formed with orifices 161a and 161b corresponding in shape to the orifices 146a and 146b. The cover gaskets are formed from a suitable resilient material, such as a plastic, which is sufficiently resilient to provide an effective seal between the respective members and which is resistant to the liquid with with the air eliminator is adapted to be used. Ring gaskets 162a and 162b, preferably of similar material, are provided between the casing 130 and end plates 140a and 140b respectively.

Figures 17, 18, 19:
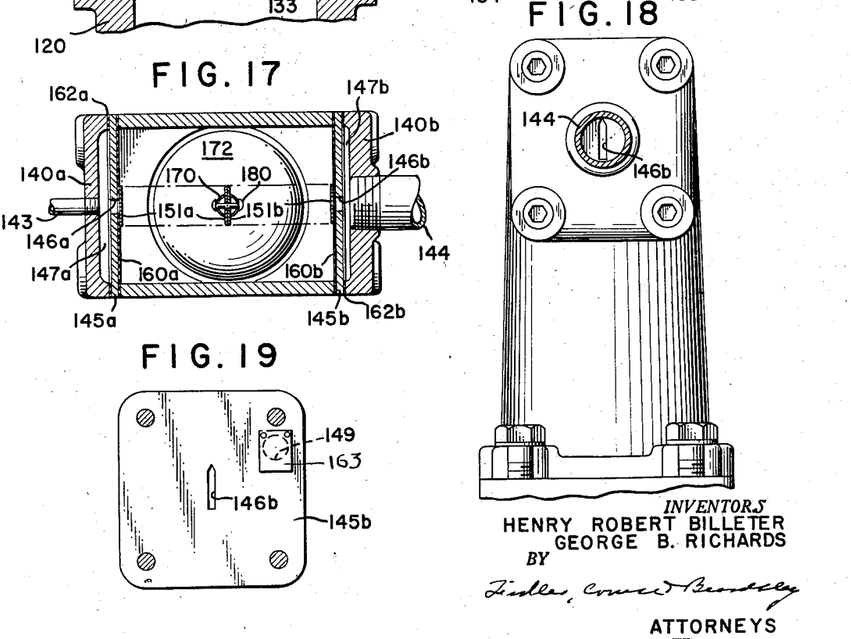
Fig. 17 is a view of a section taken along line 17—17 of Fig. 15.
Fig. 18 is an end elevational view of the air eliminator of Fig. 15.
Fig. 19 is an enlarged fragmentary sectional view taken along line 19—19 of Fig. 15.
Figure 20:
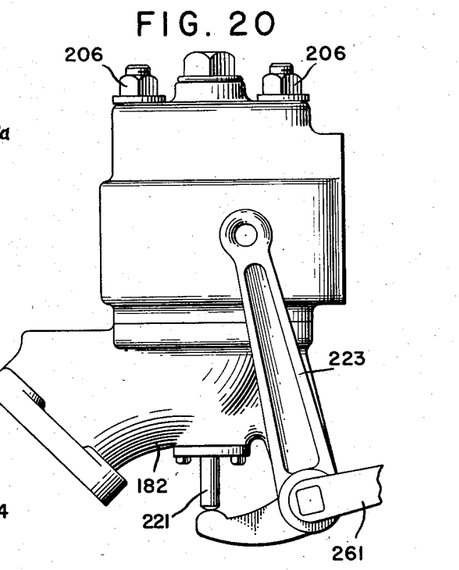
Fig. 20 is a side elevational view of the cut-off valve.
Figure 21:
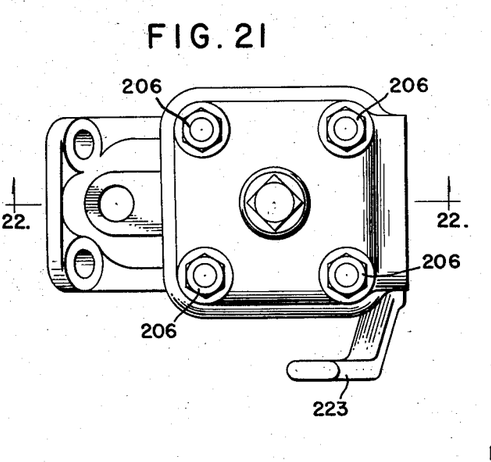
Fig. 21 is a top plan view of the cut-off valve.

The chambers 147a and 147b are connected by a passage 148 formed in the upper portion of the casing 130. The orifice plate 145b is provided with a corresponding opening 149 (see Fig. 19) registering with the passage 148, and the gasket 160b is provided with a similar opening, not shown), whereby to permit communication between the chambers 147a and 147b.

A flap or reed valve 163 is secured to the orifice plate 145a which permits gas to flow through the passage 148 from the chamber 147a to the chamber 147b but prevents reverse flow of air, for a purpose which will hereinafter appear.

The orifices 146a and 146b are adapted to be closed by valves 151a and 151b which are similar in construction and accordingly only one of the valves and the associated portions of the air eliminator will be described in detail. When the valves are in open position, the float chamber 131 communicates with the pipe 143 through the left-hand orifice 146a, and with the pipe 144 through the right-hand orifice 146b.

The valve 151a takes the form of an elongated flat strip of flexible, resilient material, preferably metal, which is inert to the liquid with which the air eliminator is adapted to be used. While any spring material having suitable flexibility, resiliency and inertness may be used, I have found that a spring steel alloy sold under the name "Elgiloy" provides excellent results.

The valve 151a is of sufficient width to extend across and completely close the orifice 146a when the valve is in closed position and is of sufficient length to permit it to be mounted and actuated as hereinafter described.

The valve strip or element 151a is rigidly secured suitably to the casing at a point below the orifice 146a and in such position that the adjacent portion of the strip lies against the inner face of the cover gasket 160a, at all times.

The other end of the valve element or strip 151a is attached as by rivet 180 to a tubular stem 170 forming a portion of a float 172. The stem 170 extends through and is sealingly secured in the "ball" portion 173 of the float and projects therefrom at each end. The stem 170 is hollow and receives an upstanding guide post 174 which is rigidly secured in and upstanding from the plate 134. The stem 170 thus serves to guide the float 172 for movement in a vertical direction within the float chamber 131.

The other valve element 151b is secured to the casing and to the stem 170 in a similar manner but reversed position so that it is positioned against the inner face of the gasket 160b and the two valve elements 151a and 151b mutually abut at their portions adjacent the ends which are secured to the stem 170.

Each valve element 151a is so secured to and supported by the casing 130 and the float 172 that in all positions thereof throughout its range of movement from its lower, open position (as shown in broken lines in Fig. 15) to its upper, closed position (as shown in full lines in Fig. 15) it has a free portion extending between the portion which bears against the face of the orifice plate and the portion which bears against the other valve element which free portion is bent back upon itself and assumes a curved shape. The free portion retains the same curvature in all positions of the float. This is effected by attaching the valve element only at its ends, to the casing and stop respectively, and providing for movement of the float in a direction parallel to the face of the orifice plates.

The two valve elements 151a and 151b are connected to the casing 130 and to the stem 170 at diametrically opposite points whereby the two valves 151a and 151b are disposed in opposition. Accordingly, they exert on the stem 170 and accordingly on the float 172 equal and opposite forces so that the float normally is freely supported by the valve elements 151a and 151b in the float chamber and does not bear against the guide stem 174. The guide stem 174 however is provided so as to insure true vertical movement of the float 172 in a direction parallel to the faces of the orifice plates 145a and 145b.

Since the assembly consisting of the valve elements 151a and 151b, and the float 72 is freely supported, the forces exerted by the respective valve elements 151a and 151b against their respective orifice plates 145a and 145b (that is, against the gaskets 160a and 160b) are equal and the valves therefore are completely balanced against each other.

Moreover, the arrangement is such that each of the valves 151a and 151b is under stress throughout its entire range of movement which stress causes the valve to be urged against its orfice plate throughout at least a portion of the valve during its entire range of movement. As will be seen from the drawings when the float is in its lower position, the valves 151a and 151b bear against the faces of their respective orifice plates 145a and 145b throughout only the lower portions of the valves and at an area on each of the orifice plates below the orifices 156a and 156b. However, as the float 172 rises to its upper position, as established by the abutment of the lower inturned end of the stem 170 against the stop 175 formed on the upper end of the stem 174, the valves 151a and 151b bear against their respective orifice plates at portions entirely surrounding the orifices in order to provide complete closures for the two orifices 146a and 146b. Thus it will be seen that valve elements 151a and 151b are urged into their positions closing and sealing the orfices 146a and 146b by the resilience of the valve elements 151a and 151b themselves.

Assuming that the gas has been removed and liquid stands in the air eliminator 39 at a level sufficient to raise the float to its uppermost position, the valves 151a and 151b are in closed positions. Thus the valves lie against their respective orifice plates 145a and 145b and extend entirely over and sealingly close the respective orifices 146a and 146b so that no liquid can escape from the head.

It will be noted that the valves 151a and 151b lie flat against their respective orifice plates throughout a substantial zone thereof and particularly a zone on both sides of and above and below the orifices 146a and 146b so that the latter are fully closed. As noted above, the spring pressure of the valves 151a and 151b provided by reason of their bowed or curved form insures that the closing portions thereof are maintained against their respective orifice plates regardless of the presence of any air or liquid pressure within the float chamber 131.

When gas enters the float chamber 131 from the filter casing, such gas displaces the liquid in the float chamber 131 and causes the level to fall. When this occurs, the float 172, which is buoyantly supported by the liquid, also falls and carries with it the stem 170 to which the valves 151a and 151b are attached. The downward movement of the stem 170 causes the ends of the valves 151a and 151b attached thereto to move downwardly in a direction parallel to the faces of the orifice plates with the result that the portions of the valves 151a and 151b, which previously lay against the orifice plates, are stripped or "peeled" away from the orifice plates 145a and 145b progressively downwardly, and as the downward movement of the float continues the orifices 146a and 146b are progressively uncovered in a direction from the upper portions thereof toward the lower portions.

As soon as the orifices 146a and 146b have been uncovered by the above-described opening movement of the valves 151a and 151b, the gas trapped in the float chamber 131 above the level of the liquid in the system and which normally is under some pressure is caused to flow out of the float chamber through the orifices 146a and 146b and the pipes 143a and 144 for a purpose which will hereinafter appear.

When the gas has been discharged to such an extent that the liquid level rises sufficiently to support and lift the float 172, the latter is elevated and causes the valves 151a and 151b to be moved in a reverse direction to that described above in connection with the opening of the valve. That is to say, that as the float 172 moves upwardly the valves are caused to progressively move against their respective orifice plates to an increasing degree and to progressively close their respective orifices until the orifices are completely closed and the valves extend in contact with their respective orifice plates both above and below the orifices. When the valves are closed, no further gas can escape from the float chamber 131.

The meter 40 may be of any suitable form of meter for measuring the flow of liquids therethrough, but I prefer to employ a meter such as shown and described in the copending application of George B. Richards Serial No. 522,930, filed July 19, 1955, now Patent No. 2,835,-229, patented May 20, 1958 to which reference may be made for a more detailed disclosure of the meter.

Figures 12, 13, 14:
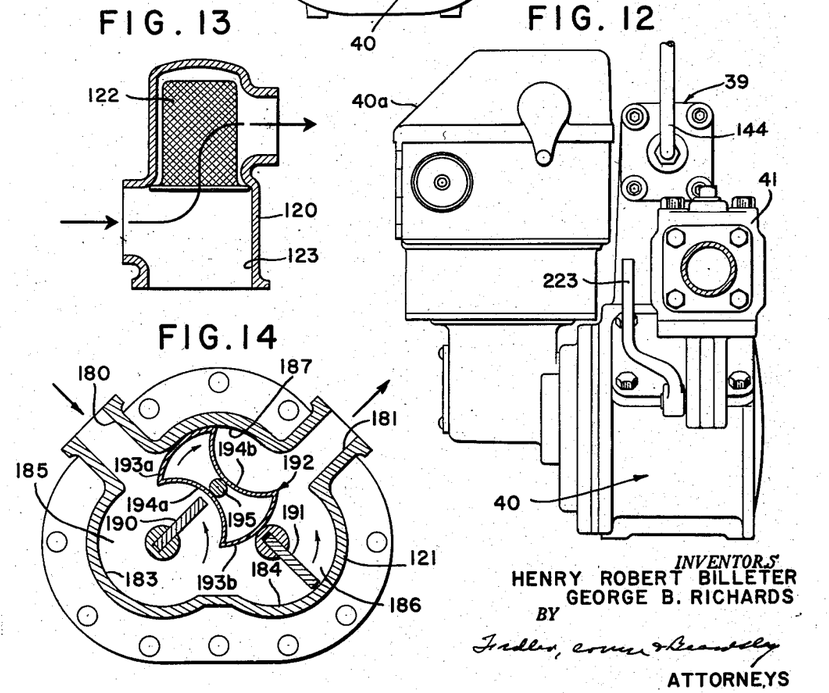
Fig. 12 is an end elevational view of the assembly of Fig. 11.
Fig. 13 is a fragmentary, horizontal sectional view taken along line 13—13 of Fig. 11.
Fig. 14 is a fragmentary, somewhat diagrammatic vertical sectional view showing the interior of the meter.

Briefly, the meter 40 includes the hollow casing 121 having an inlet port 180 connected to the outlet of the strainer casing 120, and an outlet port 181 leading to the casing 182 of the shut-off valve 41. The casing 121 has a pair of semi-cylindrical, rotor-sealing wall portions 183 and 184 defining inlet and outlet cavities or chambers 185 and 186 which are in free communication. The casing 121 also has a blocking wall portion 187 extending between the inlet and outlet ports 180 and 181 on the opposite side of the casing from the rotor-sealing wall portions 183 and 184.

A pair of displacement rotors 190 and 191 which also are referred to as "inlet" and "outlet" rotors, respectively, are rotatably mounted in the casing 121 in position to pass in sealing relation with the wall portions 183 and 184 for approximately 180° of their rotation respectively. Rotatably mounted in the casing 121 is a blocking rotor 192 having oppositely disposed peripheral, sealing wall portions 193a and 193b of convex circular form positioned to pass alternately in sealing relation with the blocking wall portion 187. The blocking rotor 192 is provided intermediate the peripheral portions 193a and 193b with deep recesses 194a and 194b adapted to permit the displacement rotors 190 and 191 to pass successively therethrough during the rotation of the rotors as hereinafter explained. The blocking wall portion 187 is of such dimension relatively to the peripheral portions respectively of the blocking rotor that a complete seal is provided between the blocking wall portion 187 and the blocking rotor 192 at all times during the rotation of the blocking rotor. That is to say either one or the other of the peripheral or blocking surfaces 193a and 193b of the blocking rotor 192 is always in sealing engagement with the blocking wall portion 187.

The peripheral portions 193a and 193b which also serve as sealing portions of the blocking rotor 192 are disposed to pass in sealing relation with the displacement rotors 190 and 191 when the latter are in sealing relation with their respective sealing wall portions 183 and 184 so that the blocking rotor 192 and the respective one of the displacement rotors provide a three point seal with each other and with the casing, namely, a seal between the displacement rotor and its corresponding sealing wall portion, between the displacement rotor and the corresponding portion of the blocking rotor, and between the other peripheral or sealing portion of the blocking rotor and the blocking wall portion of the casing.

The two displacement rotors 190 and 191 are drivingly connected to the blocking rotor 192 by gears (not shown) in such angular relation that the rotors rotate simultaneously in a fixed phase relation whereby first one and then the other of the displacement rotors is in sealing relation with its corresponding sealing wall portion of the casing and simultaneously in sealing relation with the blocking rotor, while the other displacement rotor is in spaced relation with the casing and with the blocking rotor. It will be noted that the recesses 194a and 194b of the blocking rotor are of such depth and peripheral extent as to permit the respective displacement rotors to pass therethrough freely and without any sealing effect.

The blocking rotor 192 is connected to and drives a shaft 195 which is drivingly connected to a counter 40a mounted on the meter casing and which serves to count the revolutions of the blocking rotor and thus indicate the volume of liquid which passes through the meter. The counter 40a may be of any suitable construction and the details thereof form no part of the present invention.

The operation of the meter is as explained more in detail in the copending application of George B. Richards above referred to. Briefly, liquid flows into the meter casing through the inlet 180 and out of the outlet 181. In passing through the casing the liquid causes the displacement rotors 190 and 191 to be rotated and since they are connected to the blocking rotor the latter is rotated at an angular velocity and angular relationship relatively to the displacement rotors determined by the gearing. In the present illustrative embodiment of the meter the gearing is so selected and arranged that the blocking rotor is rotated at an angular velocity of one-half that of the displacement rotors.

During each cycle of operation the inlet rotor 190 first closes the cavity 185 by engagement with the sealing wall surface 183 and with one of the sealing surfaces of the blocking rotor 192 and then sweeps around the sealing wall surface 183 in sealing relation therewith. During this portion of the cycle the outlet rotor 191 passes through one of the cavities in the blocking rotor in spaced relation to the blocking rotor and in spaced relation to the sealing wall surface 184 so that this rotor is not in a sealing or active phase. When the inlet rotor 190 reaches the end of the sealing wall surface 183, and just as it breaks the seal with that surface and with the blocking rotor 192, the outlet rotor 191 engages the sealing wall surface 184 in sealing relation and also the blocking rotor 192 in sealing relation with one of the sealing surfaces thereof. Thus, as the seal between the inlet rotor 190 and the casing and the blocking rotor is broken, the seal between the outlet rotor 191 and the casing and with the blocking rotor is made.

It will be seen, therefore, that during each complete revolution of one of the displacement rotors a volume of liquid is displaced which is equal to twice the effective volume of one or the other of the cavities, and since each displacement blade sweeps its cavity twice during a full cycle of the meter (that is one revolution of the blocking rotor) it follows that a quantity of liquid is displaced during each cycle of the meter equal to four times the effective volume of one of the cavities.

Referring now particularly to Figs. 20 to 23 there is illustrated the cut-off valve 41, in which views the valve is shown in closed position. The function of the valve is to shut off the flow of liquid through the meter whenever gas enters the line in which the meter is connected, in order to prevent a false reading of the amount of the liquid passing through the meter, which would result if gas were permitted to pass through the meter. The cut-off valve 41 may be of any suitable construction but preferably is a balanced valve embodying certain principles and structure of the valve disclosed and claimed in the copending applications of George B. Richards, Ser. No. 390,874 filed March 9, 1954 and of Henry Robert Billeter and George B. Richards, Serial No. 546,978, filed November 15, 1955.

Figure 22:
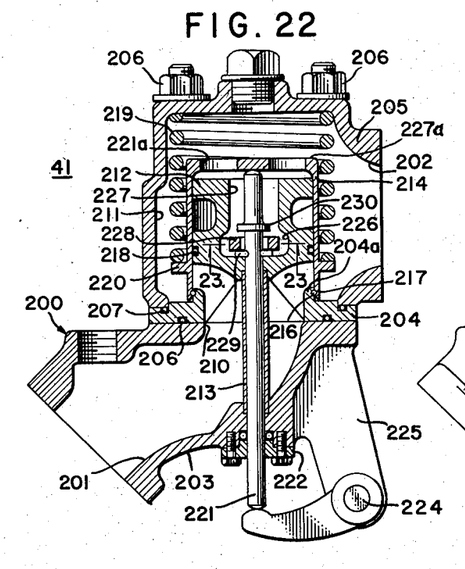
Fig. 22 is a vertical section taken on line 22—22 of Fig. 21.
Figure 23:
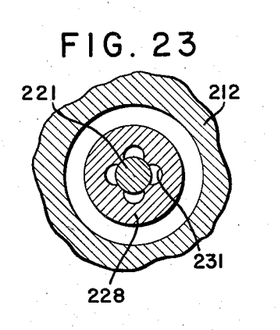
Fig. 23 is a fragmentary sectional view taken along line 23—23 of Fig. 22.

The cut-off valve 41 includes a hollow casing 200 having an inlet 201 connected to the outlet 181 of the meter and an outlet 202 connected to the discharge hose 42. The valve housing 200 preferably is formed by an inlet section 203, a seat member 204 providing a valve seat and an outlet section 205 defining a chamber 211, the sections being suitably secured together as by bolts 206. The joints between the housing sections are sealed as by O rings 206 and 207.

The valve seat member 204 is provided with a passage 210 therethrough which connects the inlet 201 with the chamber 211 of the outlet section 210 from which leads the outlet 202. A cylindrical valve guide 212 is rigidly supported in the chamber 211, as by a hollow post 213 secured in the inlet section 203. A generally cup-shaped valve element 214 is supported on the valve guide 212 for vertical sliding movement thereon between a position wherein the lower end of the valve element 214 closes against the seat member 204 and a position wherein the valve element 214 is raised above the valve seat member 204 and liquid is permitted to pass between the valve seat section and the valve element 214.

For the purpose of providing an effective seal between the valve element 214 and the valve seat member 204, the latter is provided with an upturned lip 204a surrounding the opening 210 and having an annular groove 216 in which is recessed an O ring 217 providing a seal between the valve element 214 and the seat member 204 when the valve element 214 is in its lower, closed position. The end edge or face of the valve 214 is inclined at an angle of 45° so that the end of the valve 214 rides over the O ring readily in moving into closed position.

The valve element 214 is sealingly supported on the valve guide 212 so that when the valve element 214 is in sealing relation against the valve seat member 204 no liquid can pass from the interior of the valve element 214 below the valve guide 212 and into the chamber 211. To this end a seal comprising an O ring 218 seated in a groove in the valve guide 212 is provided.

The valve element 214 is normally urged into closed position against the valve seat member 204 by a coiled spring 219 which is seated at one end against the top of the casing section 205 and at the other end against a flange 220 formed on the outer portion of the valve element 214.

The valve element 214 is provided with a pluarlity of openings 221a in its upper wall of the purpose of permitting liquid to flow freely through the upper wall and thus prevent the establishment of a vacuum between the valve 214 and the valve guide 212 when the valve element 214 is lifted.

Slidably guided in the post 213 for vertical movement therein is a valve actuating rod 221 which extends through the bottom wall of the casing section 203 and is sealed therein as by a seal 222. The rod 221 is adapted be raised by a crank 223 pivotally supported by a pin 224 in a bracket 225 fixed to the casing of the valve 41.

The rod 221 at its upper portion projects from the valve guide 212 and abuts the upper wall 227a of the valve 214 whereby upon upward movement of the rod 221 the valve 214 is raised.

The valve guide is provided with an upwardly opening recess having a lower, enlarged portion 226 and an upper reduced portion 227. Carried on the rod 221 is a washer 228 formed of flexible resilient material and dimensioned to have a sliding fit in the upper portion 227 of the recess. The washer 228 is supported on the rod 221 as by a split ring 229 and its upward movement relatively to the stem is limited by a flange 230 on the rod. The washer 228 is provided with a plurality of openings 231 providing passages therethrough for a purpose which will now appear.

In operation of the valve 41, the valve is opened by rocking the cranks 223 in a clockwise direction which raises the valve element 214 away from the seat member 204, and the valve element is held in open position until released (all as hereinafter explained). At the same time the washer 228 is moved into the reduced portion 227 of the recess. When the valve element is released, it is moved toward closed position by the spring 219. The washer 228 cooperates with the recess portions 226 and 227 to provide an action in the nature of a dash-pot action, thereby to retard the closing movement of the valve element. In this connection, it will be noted that the liquid in the recess portion 226 is permitted to pass through the openings 231 in the washer 228 into the recess portion 227 so that the closing of the valve is not prevented.

Means are provided for automatically permitting the closing of the valve 41 to cut off further flow of liquid through the meter whenever gas enters the line and accumulates in the air eliminator in such quantity as to cause opening of the valves thereof. Thus, gas is prevented from passing through the meter and causing a false indication of the volume of liquid passing through the meter.

Figure 24:
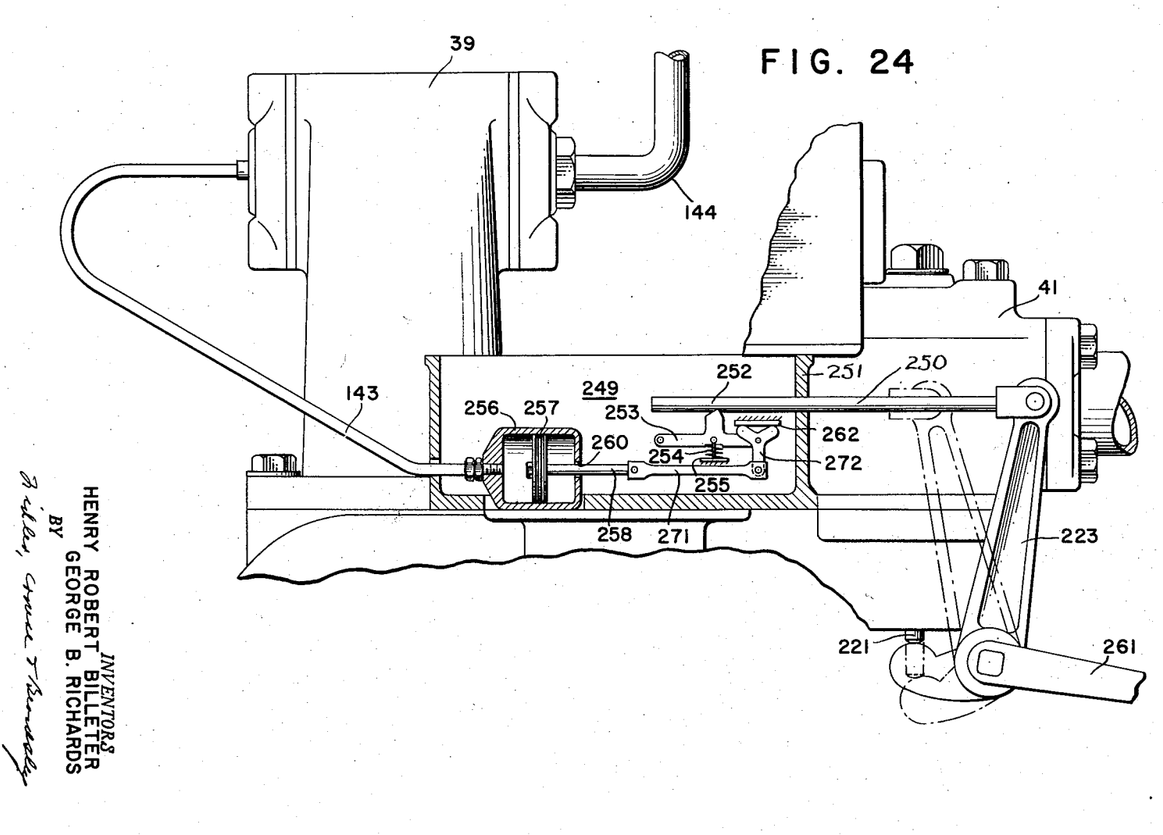
Fig. 24 is a fragmentary side elevational view, with certain of the parts broken away and in section, showing the automatic stop mechanism.

As stated above, the cut-off valve 41 is so constructed that the valve is normally urged toward closed position. However, we provide valve control mechanism 249, such as disclosed and claimed in the copending application of George B. Richards, Serial No. 553,506, filed December 16, 1955 for holding the valve in open position during the normal operation of the system. Such mechanism is arranged to operate to permit the valve to close whenever gas enters the system. In Fig. 24 the mechanism is shown in the position corresponding to the open position of the valve.

To the foregoing end a latch rod 250 is pivotally connected to the crank 223 and is slidably guided in a portion 251 of the frame and is formed adjacent the other end with a latching notch 252. A dog 253 is pivotally mounted on the frame in position to engage the notch 252 and is suitably urged in a clockwise direction, as by a spring 254 bearing against a fixed clip 255 to maintain engagement with the latch 252 and hold the rod 250 and connected crank 223 in such a position (as shown in Fig. 24, for example) that the valve 214 is maintained in its open position.

A latch tripping means is mounted adjacent the latch 253 and includes a closed cylinder 256 in which is slidably disposed a piston 257 which carries a latch tripping rod 258 projecting through an opening 260 in the cylinder end wall, which opening vents the corresponding side of the cylinder to atmosphere. The rod 258 is pivotally connected to a link 271, which in turn is pivotally connected to one arm of a Y cam 272 pivotally connected at its center to the free end of the latch dog 253 and having its free, camming arms bearing against a fixed clip 262. The cam 272 is arranged to rotate the latch 253 in a clockwise (unlatching) direction when the piston 257 is moved in an appropriate direction (to the right as viewed in Fig. 24). The arrangement is such that the latch dog 253 normally is urged into latching position by the spring 254, and the piston is positioned midway of its stroke in the cylinder 256. The latch dog 253 is moved out of its latching position, or "tripped" when pressure is applied to the cylinder through the pipe 143 which is connected to the "pressure" side of the cylinder.

The crank 223 is provided with a reset arm 261 by which it may be reset manually after the latch has been tripped.

Under normal conditions of operation only liquid passes through the line and there is no gas passing therethrough. Accordingly, the latch, after having been moved to latching position, remains in such position and the cut-off valve is held in open position to permit liquid to pass therethrough.

When there is no gas passing through the line, the float 172 of the air eliminator remains in its upper position and the air eliminator valves 151a and 151b remain closed. The pressure on the fluid in the air eliminator chamber 131 is equal to the sum of the pressure in the tank 24 plus the pressure resulting from the static head less pressure losses in the line. The pressure in the air eliminator chamber 147b and pipe 144 is at least equal to atmospheric pressure and may be as great as the pressure in the tank 24. The gas in the chamber 147a, the pipe 143 and the cylinder 256 is at atmospheric pressure. However, the reed valve 163 prevents any back flow of air from the chamber 147b to the chamber 147a.

Should any gas enter the line, it rises in the float chamber 131 of the air eliminator 39 and consequently does not pass through the meter 40. The gas which collects above the liquid in the float chamber is, of course, at the same pressure as that of the liquid in the line.

As gas collects in the float chamber 131, the float 172 descends accordingly until it reaches a point at which it causes the valves 151a and 151b to open. Upon the opening of the valves 151a and 151b the pressure that has been built up on the gas in the float chamber is suddenly transmitted to the cylinder at the "pressure" side of the piston 257. This sudden pressure is sufficient to move the piston 257 to cause the cam 261 to trip the latch 253 and permit the valve 41 to close, thereby preventing further flow of liquid or gas through the line.

It should be noted at this point that the apparatus is so designed that the air eliminator valves open to actuate the tripping mechanism and permit the cut-off valve to close before any gas passes through the meter.

Gas passes out of the air eliminator through the pipe 144 and is discharged into the tank 24. When liquid flow is again established in the line, the float 172 again rises to close the valves 151a and 151b. The check valve 144a prevents any back flow of gas from the tank 24 to the air eliminator 39. The valve 41 is then opened and the latch 253 reset to hold the valve 41 open, which operation is performed manually by rotating the crank in a clockwise direction.

The pressure created in the cylinder 256, the pipe 143 and the chamber 147a by the resetting of the latch 253 is relieved through the passage 148, and the reed valve 149 to the chamber 147b.

It will be seen that the arrangement is such that there is no possibility of losing the pressure on the tank by reason of the complete emptying of a compartment of the tank. Whenever all of the liquid passes from the compartment and gas enters the line, this causes the air eliminator to open and cause the cut-off valve 41 to close. Gas discharged from the air eliminator to the cylinder 256 is trapped therein. Gas discharged from the air eliminator through the pipe 144 is returned to the tank 24 and back flow from the latter is prevented by the check valve 144a.

In the operation of the system in accordance with our invention as hereinabove described, the discharge pipe or hose 42 is connected to the tank or other receptacle into which the contents of the tank 24 are to be discharged. In the particular application illustrated in Fig. 1, the pipe or hose 42 is connected to the lead-in pipe 50 of the tank 51. A selected one of the manifold valves 48 is opened to thereby permit gravity flow of the liquid from the corresponding compartment 33, which liquid flows through the manifold 36, the outlet pipe 37, the strainer 38, the meter 40, the cut-off valve 41, the hose 42, and the lead-in pipe 50.

As the liquid flows through the strainer 38, any solids are removed by the filter and the liquid passes therefrom free of such solid particles.

The liquid then flows through the meter 40 and causes the rotors to be rotated which, as above explained, effect rotation of the counter and thereby provides an indication of the quantity of liquid which flows through the meter. So long as only liquid and no gas flows through the line leading from the tank 24 to the fixed tank 51, the shut-off valve 41 remains open and the liquid may flow freely. On the other hand, should any gas enter the line, it will, as above explained, enter the float chamber of the air eliminator 39 and, when sufficient gas has collected therein, the air eliminator valves will open to actuate the trip mechanism 249 to allow the shut-off valve 41 to close and thereby prevent any likelihood of the air passing through the meter and causing a false indication on the counter. When this occurs and after the gas has been exhausted from the air eliminator and the latter is closed, the operator resets the shut-off valve in open position, whereupon the discharge of the liquid continues.

The discharge of the liquid from the tank 24 may be expedited and the discharge of all of the liquid from each of several compartments may be insured by applying the gaseous pressure developed in the exhaust from the internal combustion engine. This is effected merely by starting the engine and by adjusting the pressure regulator valve 61 to the desired setting so as to provide the desired degree of pressure within the several compartments of the tank 24. As will be understood from the foregoing, the pressure of the gases applied to the compartments of the tank depends upon the setting of the pressure regulator valve and such pressure may be varied from the maximum pressure developed in the exhaust (less, of course, the pressure losses between the exhaust and the interior of the tank 24) and a minimum wherein little, if any, pressure is applied to the compartments of the tank 24, the exhaust gases being vented through the muffler by placing the valve 61 in fully open position. At this point it should be noted that even when the valve 61 is in fully closed position, the pressure of the exhaust gases passing into the tank 24 is limited by the safety or pressure release valve 70 which may be set to open at any predetermined pressure and thereby by-pass the pressure relief valve 61 and permit a portion of the exhaust gases to pass out through the muffler.

The hot exhaust gases pass from the casing of the pressure regulator and through the flame arrester or fire stop 28 which in the manner above explained prevents the passage of any sparks or ignited gases.

From the flame arrester or fire stop 28 the gases pass through the intercooler by which they are cooled to a safe temperature so that when they enter the tank 24, there will be no danger of ignition or explosion of the contents of the tank.

The gases passing from the intercooler 29 pass through the pipe or hose 30 and from thence into the manifold 31 from whence they pass into the several compartments 33 of the tank 24 and thereby apply pressure to the contents which serve to aid in the discharge of the contents from that compartment or those compartments which are connected to the discharge or outlet 37 by the opening of the respective valves of the manifold.

The present invention provides apparatus for quickly, safely and completely discharging liquid from a tank as for example the tank or compartment of a tank truck or tank trailer. The source of pressure provided by the preferred embodiment of the invention, namely, an automotive engine is always available where a tank truck or tractor-tank trailer combination is to be unloaded and therefore no additional source of gaseous pressure is required.

The apparatus provides safety means for permitting the utilization of the pressure developed in the exhaust of an automotive engine for discharging the tank whereby there is no likelihood of ignition or explosion of the contents of the tank, even where they are of an inflammable or explosive nature as is the case with petroleum products such as gasoline and oil. In the apparatus the exhaust gases or a portion thereof are conducted through a valve which controls the pressure, and thence through a flame arrester which prevents the passage therepast of any burning combustion products, and finally a heat exchanger which reduces the temperature of the gases to a safe temperature before they enter the tank. The inert exhaust gases serve as a non-inflammable gaseous blanket for the contents of the tank and aid in preventing any accidental ignition. Moreover, the presence of such inert gases substantially eliminates the possibility of an explosive mixture being formed, as often happens where air is present in a tank containing an explosive liquid such as gasoline.

The apparatus provides not only means for discharging the liquid contents of the tank but also means for accurately measuring the amount of liquid discharged from the tank. The measuring means has associated therewith cut-off means for preventing the passage of gas through the meter so that there is no likelihood of any false indication such as might otherwise result owing to the passage of the air or gas through the meter. The cut-off means is automatically actuated by the presence of gas in the line between the tank and the meter and therefore it does not require any attention except that in the embodiment of the invention shown it must be reset after it has operated to cut off the flow of liquid through the meter.

The provision of the shut-off means also insures against the loss of pressure in the tank. Thus, should the operator neglect to close the corresponding manifold valve when a compartment is emptied, the cut-off mechanism would prevent gas from being drawn into the discharge line and the pressure in the tank would not be reduced.

The apparatus is relatively simple and therefore may be manufactured and assembled relatively inexpensively. Moreover, the apparatus is such that it may be installed in an existing tank truck or truck-trailer combination without the necessity for reconstructing or substantially modifying the truck or truck-trailer combination. The apparatus is simple and positive in action and requires a minimum of servicing and attention and a minimum of repair or replacement of parts over a long period of use.

The apparatus is simple, light and compact, and therefore does not add greatly to the weight of the truck or truck-trailer combination. Moreover, it requires only a relatively small space for installation and therefore does not in any way encumber the truck or truck-trailer combination on which installed or interfere in any way with the normal and usual mode of operating such vehicles.

We claim:

1. Apparatus for discharging liquid from a tank comprising an internal combustion engine, means including a take-off conduit connecting the exhaust of said engine to the tank, a flame arrestor in said take-off conduit, a discharge conduit leading from the tank, a meter in said discharge conduit, and means actuated by the presence of gas in said discharge conduit ahead of said meter for closing said conduit.

2. Apparatus for discharging liquid from a tank comprising an internal combustion engine, means including a take-off conduit connecting the exhaust of said engine to the interior of the tank, pressure regulating, flame arresting and heat dissipating means in said take-off conduit, a discharge conduit leading from the tank, a meter for measuring the flow of liquid through said discharge conduit, means in said discharge conduit for discharging gas from said conduit ahead of said meter, a cut-off valve in said discharge conduit, and means actuated by the discharge of gas from said gas discharge means for closing said valve upon the presence of gas in said discharge conduit ahead of said meter.

3. A self-contained, pressure-discharging tank truck comprising a tank for containing liquids carried by said truck, an internal combustion engine carried by said truck, means connecting the exhaust of said engine to the interior of said tank, and discharge means carried by said truck including a discharge conduit leading from said tank, a meter in said discharge conduit, and means actuated by the presence of gas in said conduit ahead of said meter for closing said conduit.

4. A self-contained pressure-discharging tank truck comprising a tank for containing liquids, an internal combustion engine carried by said truck, means connecting the exhaust of said engine to the interior of said tank, and discharge means carried by said truck including a discharge conduit leading from said tank, a meter for measuring the flow of liquid through said conduit, means in said conduit for discharging gas from said conduit ahead of said meter, a cut-off valve in said conduit and means controlled by the discharge of gas from said gas discharge means for closing said valve.

References Cited in the file of this patent

UNITED STATES PATENTS

| | | |
|---|---|---|
| 2,075,126 | Marden | Mar. 30, 1937 |
| 2,114,558 | Dismukes | Apr. 19, 1938 |
| 2,186,069 | Hazard | Jan. 9, 1940 |
| 2,276,838 | Grise | Mar. 17, 1942 |
| 2,276,839 | Grise | Mar. 17, 1942 |
| 2,693,196 | Hundley | Nov. 2, 1954 |
| 2,794,452 | Quam | June 4, 1957 |